United States Patent [19]

Goldstein et al.

[11] Patent Number: 5,206,096

[45] Date of Patent: Apr. 27, 1993

[54] SLURRY FOR USE IN RECHARGEABLE METAL-AIR BATTERIES

[75] Inventors: Jonathan Goldstein, Jerusalem; Arieh Meitay, Rishon Lezion, both of Israel

[73] Assignee: Electric Fuel Limited, Jerusalem, Israel

[21] Appl. No.: 636,226

[22] Filed: Dec. 31, 1990

[51] Int. Cl.$^5$ .............................................. H01M 4/86
[52] U.S. Cl. ........................................ 429/27; 429/29; 429/193; 429/206
[58] Field of Search .................. 429/193, 206, 29, 15, 429/27, 51, 190; 252/182.1

[56] References Cited

U.S. PATENT DOCUMENTS

| | | | |
|---|---|---|---|
| 3,890,159 | 6/1975 | Thornton | 429/222 |
| 3,922,174 | 11/1975 | Heller | 429/196 |
| 4,084,047 | 4/1978 | Himy et al. | 429/229 |
| 4,085,241 | 4/1978 | Sheibley | 429/254 |
| 4,195,120 | 3/1980 | Rossler et al. | 429/57 |
| 4,207,382 | 6/1980 | Zaromb | 429/34 |
| 4,331,746 | 5/1982 | Sheibley | 429/144 |
| 4,362,794 | 12/1982 | Abraham | 429/196 |
| 4,384,028 | 5/1983 | Surprenant | 429/105 |
| 4,491,624 | 1/1985 | Sarbacher et al. | 429/69 |
| 4,554,222 | 11/1985 | Zaromb | 429/101 |
| 4,563,404 | 1/1986 | Bahary | 429/217 |
| 5,145,752 | 9/1992 | Goldstein et al. | 429/42 |

*Primary Examiner*—Anthony McFarlane
*Attorney, Agent, or Firm*—Helfgott & Karas

[57] ABSTRACT

A slurry for use in metal-air batteries comprises an admixture of particulate porous zinc, an aqueous solution of at least one Group Ia metal hydroxide, an inorganic inhibitor ingredient effective to inhibit the interaction of porous zinc with the Group Ia metal hydroxide which would otherwise result in the evolution of hydrogen gas, a gelling agent, a particulate and/or fibrous filler, a labelling agent, and a dissolved electrolyte extender.

43 Claims, No Drawings

SLURRY FOR USE IN RECHARGEABLE METAL-AIR BATTERIES

FIELD AND BACKGROUND OF THE INVENTION

The present invention relates to a slurry for use in rechargeable metal-air batteries generally, and more particularly, to rechargeable electric batteries useful in electric vehicles and energy storage systems.

Various proposals have been made in the past for electric powered vehicles. To date, for a number of reasons, electric vehicle systems have yet to become commercially viable generally, for urban and highway applications.

There have been proposals to employ zinc/air batteries for urban vehicle propulsion. An example is the following publication: Improved slurry zinc/air systems as batteries for urban vehicle propulsion, by P. C. Foller, Journal of Applied Electrochemistry 16 (19860, 527–543.

Metal/air battery structures are described in the following publications: U.S. Pat. Nos. 4,842,963, entitled Zinc Electrode and Rechargeable Zinc-Air Battery; 4,147,839, entitled Electrochemical Cell with Stirred Slurry; 4,908,281, entitled Metal/air Battery with Recirculating Electrolyte; 3,847,671, entitled Hydraulically-Refuelable Metal-Gas Depolarized Battery System; 4,925,744, entitled Primary Aluminum-Air Battery; 3,716,413, entitled Rechargeable Electrochemical Power Supply; 4,925,744, entitled Primary Aluminum-Air Battery. In U.S. Pat. No. 3,592,698, entitled Metal Fuel Battery with Fuel Suspended in Electrolyte, there is described inter alia a method for circulating an electrolyte/metal fuel powder mixture through the batteries; U.S. Pat. No. 4,126,733, entitled Electrochemical Generator Comprising an Electrode in the Form of a Suspension, relates to a similar subject using a circulated suspension of inert cores coated with an electrochemically active material.

Electrical energy storage systems are described in the following publications: U.S. Pat. Nos. 4,843,251 entitled Energy Storage and Supply Recirculating Electrolyte; Energy on Call by John A. Casazza et al, IEEE Spectrum June, 1976, pp 44–47; 4,275,310, entitled Peak Power Generation; 4,124,805, entitled Pollution-Free Power Generating and Peak Power Load Shaving System; 4,797,566, entitled Energy Storing Apparatus.

The disclosures of the foregoing publications (including patents) are explicitly incorporated herein by reference.

SUMMARY OF THE INVENTION

It is an object of the present invention to make possible from a practical point of view, the general commercial viability of metal-air batteries, more particularly for use in electric vehicle propulsion and energy storage systems.

A more specific object of the invention is to provide a rechargeable slurry for use in metal-air batteries.

Other objects of the invention will become apparent from the description which follows.

The present invention accordingly provides a slurry for use in metal-air batteries which comprises an admixture of at least components (a), (b) and (c), of the following components (a), (b), (c), (d), (e), (f) and (g):

(a) particles comprising a metal, preferably porous, selected from aluminum, iron and zinc;
(b) an aqueous solution of at least one Group Ia metal hydroxide;
(c) an inorganic inhibitor ingredient effective to inhibit the interaction of components (a) and (b) which would otherwise result in the evolution of hydrogen gas;
(d) a gelling agent;
(e) a particulate and/or fibrous filler;
(f) a labelling agent;
(g) a dissolved electrolyte extender.

DETAILED DESCRIPTION OF THE INVENTION

In the slurry of the invention, the weight ratio of the essential components (a): (b): (c) is preferably 1:0.5–2.0:0.0005–0.04, and optional components (d), (e), (f) and (g), if any or all of these are present in the slurry, are preferably present within the following weight percentages based on the weight of the total slurry, namely, (d) 0.3–3.0%, (e) 1.0–10.0%, (f) 0.001–1.0% and (g) 0.1–10.0%, provided that the percentage of zinc in the slurry is within the range of 33.3–67.0 wt. %, preferably 45.0–60.0 wt. %.

In this connection, it is noted that zinc slurries as used in conventional alkaline batteries contain more than 70 wt. % zinc typically 76 wt. % zinc, see e.g. "Handbook of Batteries and Fuel Cells" (David Linden, editor-in-chief), McGraw-Hill Book Company, 1984, at paragraph 7.3.2, the sub-paragraph headed "Gelled Anodes". In U.S. Pat. No. 4,341,841 there is described a circulating alkaline electrolyte containing 20–30 wt. % zinc particles. The contents of the cited Handbook and of U.S. Pat. No. 4,341,841 are explicitly incorporated herein by reference.

In a particular embodiment, the particles comprising a metal are selected from porous metal particles and a particulate inert substrate coated first with a conductive coating and then with the porous metal. Exemplary conductive coatings are of copper, nickel, cadmium, tin, silver or lead.

The particles comprising a preferably porous metal may have a particle size falling within the range of 100–500 microns, and in the case of a particulate inert substrate coated first with a conductive coating (e.g. of thickness between 0.5 and 5 microns) and then with porous metal, the substrate may have a particle size falling within the range of 10–250 microns. The material of the particulate inert substrate may be selected, for example, from polypropylene, polyethylene, nylon, glass and polyvinyl chloride, desirably in the form of microspheres.

When the particulate metal is porous zinc, this will preferably have a density which is 5–20% of the density of non-porous zinc, e.g. it may have a density within the range of 0.3–1.4 g./cc, preferably 0.3–1.1 g./cc, and a surface area within the range 0.5–6.0, preferably 0.75–5.0 m$^2$/g. It may be noted that zinc powder as used in conventional alkaline batteries is less porous, having a density of at least 2.5 g./cc., e.g. $\approx$3.5 g./cc, and having a very limited surface area, generally about 0.2–0.4 m$^2$/g (see "Handbook of Batteries and Fuel Cells", loc cit).

The aqueous solution is preferably a 4–12 molar aqueous solution in terms of Group Ia metal hydroxide; the at least one Group Ia metal hydroxide is preferably selected from LiOH, NaOH and KOH.

The inorganic inhibitor ingredient is preferably selected from at least one of the following, namely, oxides of antimony, bismuth, cadmium, gallium, indium, lead, mercury (including the red and yellow varieties), thallium and tin; sulfides of cadmium, iron, lead and mercury. In addition, organic inhibitors such as phosphate esters, surfactants (e.g. ethylene oxide polymers and derivatives thereof) and/or quaternary ammonium compounds (e.g. tetraethylammonium hydroxide) may also be optionally present. Metal oxide inhibitors for zinc (in practice zinc oxide) electrodes are described in U.S. Pat. No. 4,084,047, in which the inhibitors are mixed thoroughly into the zinc oxide. Although the present invention departs from the teaching of this patent, insofar as in the present slurries the electrode material cannot be zinc oxide and the inhibitors are not mixed with the anode material (i.e. the porous metal), it is presently contemplated that the metal oxide inhibitors and their mixtures as disclosed therein will be useful in the present invention; accordingly, the disclosure of this U.S. patent is explicitly incorporated herein by reference.

As regards the optional organic inhibitor, a suitable phosphate ester is e.g., that sold under the trade designation of GAFAC RA600 (BASF Corporation). In this connection, it may be noted that U.S. Pat. No. 4,195,120 teaches alkaline cells containing a predominantly zinc anode and an organic phosphate ester of the ethylene oxide adduct type; the disclosure of this patent is incorporated herein by reference. Reference may also be made to U.S. Pat. Nos. 4,112,205 which utilizes double salts containing both mercuric ion and quaternary ammonium ion as inhibitors in galvanic cells comprising zinc anodes, as well as to 3,945,849, which employs quaternary ammonium halides as inhibitor for zinc anodes; the disclosures of these U.S. patents are incorporated herein by reference.

The gelling agent is preferably selected from polyacrylic acid (e.g. Carbopol from B.F. Goodrich Co.), carboxymethylcellulose (CMC) and partially hydrolyzed polyacrylonitrile (e.g. Waterlock A-400 from Grain Processing Corporation). A method of gelling anodes for alkaline cells using hydrolyzed polyacrylonitrile is taught in U.S. Pat. No. 4,563,404, the disclosure of which is incorporated herein by reference. Other gelling agents are, for example, starch graft copolymers such as Waterlock A-221 and cross-linked polyacrylamides (e.g. as described in U.S. Pat. No. 3,884,721, the disclosure of which is incorporated herein by reference), as well as cross-linked CMC (e.g. as described in U.S. Pat. No. 4,435,488, the disclosure of which is incorporated herein by reference).

The filler may be selected from (for example) powdered graphite, carbon fibers, cellulose fibers, calcium hydroxide, silicon dioxide, titanium dioxide, titanium sub-oxide, polymeric microspheres, glass microspheres, and any such microspheres coated with a metal selected from Cu, Ni, Cd, Sn, Ag and Pb. The filler is preferably a conductive filler, particularly (but not exclusively) when the slurries contain an amount of zinc at the lower end of the 33.3–67.0 wt. % range. The filler is used in order to bulk out the slurries of the invention so as to avoid collapse during discharge. Persons skilled in the art will appreciate that a filler is not required in slurries for conventional alkaline batteries, because in this case they are so viscous that they usually must be extruded into the cells (see "Handbook of Batteries and Fuel Cells", loc cit), and the possibility of collapse in this prior instance is probably negligible.

The labelling agent, the purpose of which is to permit the ready identification of the slurry of the present invention, may be selected from, e.g., visibly colored dyes, fluorescent dyes and encapsulated magnetic particles, such as Cresol Red, sodium fluorescein or nylon-, polypropylene-, polyvinyl chloride- or polytetrafluoroethylene-encapsulated $Fe_3O_4$.

The slurry of the invention may also contain 0.1–10.0 wt. % in total, based on the total slurry, of a dissolved electrolyte extender ingredient selected from at least one of barium hydroxide, strontium hydroxide, potassium silicate, sodium silicate, sorbitol, potassium borate and potassium phosphates.

It will be appreciated that while the present invention requires that all of the components (a), (b) and (c) are present in the inventive slurry, the latter need not contain any of the optional components (d), (e), (f) and (g). In alternative embodiments of the invention, however, the slurry may contain, in addition to components (a), (b) and (c), any one, two, three or all four, of optional components (d), (e), (f) and (g).

The invention will be illustrated by the following nonlimitative example.

EXAMPLE

Zinc powder (50 g., 30 mesh), having a density and surface area, respectively, of approximately 0.6 g./cc. and 1.0 $m^2$/g., and potassium hydroxide solution (50 g., 8 molar) were stirred together, and the following ingredients were then stirred into the initial admixture: as inorganic inhibitor, yellow lead oxide (1 g.); as conductive filler, graphite (5 g., Acheson); as gelling agent, carboxymethyl cellulose (1 g.); and as indicator, Cresol Red (0.01 g.). The product was a gel-like slurry of density about 2 g./cc. The zinc did not segregate, nor was the generation of hydrogen bubbles visible. Also, the characteristic red shade of the dye could be readily identified by reflected light.

The discharge characteristics of this slurry were then tested in a zinc-air cell, which was made up of two commercial air electrodes (Electromedia Type AE 20) of active dimensions 7.1×7.1 cm. per electrode, for a total area of 100 $cm^2$. Each electrode was fitted with a current collecting tab (the positive) of nickel foil. The two electrodes were glued to a U-shaped polyvinyl chloride structure which held them parallel and about 3 mm. apart. This arrangement made up a watertight compartment of 25 ml. volume into which the slurry could be introduced. To prevent shorting between the zinc powder and the air electrodes, a layer of porous polyamide separator was glued to the electrolyte side of each air electrode inside the cell. Air was freely available to the air side of the air electrodes external to the cell. 20 ml. slurry was introduced into the space between the two separators. A copper foil (0.2 mm. thickness), tabbed with a copper strip, was inserted into the slurry as a negative current collector.

After wet-in of the separators, an open circuit voltage of 1.45 V was measured. The cell then delivered a steady current of 3 A (30 mA/$cm^2$) at an average voltage of 1.2 V for three hours to a final cut-off voltage of 1 V. The cell capacity was thus 9 Ahr. Since there were about 18 g. zinc originally in the cell, the zinc utilization was about 60%. Following discharge of the cell, the spent slurry was rinsed out with alkali. A fresh portion of slurry was introduced into the cell, giving a similar discharge performance. The spent slurry could be recharged, for example, as described in our copending application (11785), the disclosure of which is incorporated herein by reference.

While the invention has been particularly described, it will be appreciated by persons skilled in the art that many modifications and variations are possible. The invention is accordingly not to be construed as limited to the particularly described embodiments, rather its concept, scope and spirit are to be understood in the light of the claims which follow.

We claim:

1. A slurry for use in rechargeable metal-air batteries, comprising particulate porous zinc containing material of a particle size within the range of 100-500 microns and having density within the range of 0.3-1.4 g./cc and a surface area within the range of 0.5-6.0 m$^2$/g, an aqueous solution of at least one Group Ia metal hydroxide, and an inorganic inhibitor ingredient effective to inhibit interaction of said particulate porous zinc containing material and said aqueous solution to prevent evolution of hydrogen gas, wherein the weight ratio in said slurry between said porous zinc containing material, said aqueous solution and said inorganic inhibitor is 1:0.5-2.0:0.0005-0.04.

2. A slurry according to claim 1, wherein said porous zinc containing material is selected from the group consisting of porous zinc and a particulate inert substrate coated first with a conductive coating and then with porous zinc.

3. A slurry according to claim 2, wherein said material is a particulate inert substrate coated first with a conductive coating and then with porous zinc and said substrate has a particle size within the range of 10-250 microns.

4. A slurry according to claim 2, wherein said particulate inert substrate is made of a material selected from the group consisting of polypropylene, polyethylene, nylon, glass and polyvinyl chloride.

5. A slurry according to claim 2, wherein said particulate inert substrate is made of a material selected from the group consisting of polypropylene, polyethylene, nylon, glass and polyvinyl chloride microspheres.

6. A slurry according to claim 2, wherein said porous zinc has density which is 5-20% of the density of non-porous zinc.

7. A slurry according to claim 1, wherein said aqueous solution includes 4-12 moles/liter of said at least one Group Ia metal hydroxide.

8. A slurry according to claim 1, wherein said at least one Group Ia metal hydroxide is selected from the group consisting of lithium hydroxide, sodium hydroxide and potassium hydroxide.

9. A slurry according to claim 8, wherein said aqueous solution includes 4-12 moles/liter of said at least one Group Ia metal hydroxide.

10. A slurry according to claim 1, wherein said inorganic inhibitor ingredient is selected from the group consisting of one of oxides of bismuth, cadmium, gallium, indium, lead, mercury, thallium and tin and one of sulfides of cadmium, iron, lead and mercury.

11. A slurry according to claim 1, which further comprises an organic inhibitor selected from the group consisting of phosphate esters, surfactants and quaternary ammonium compounds.

12. A slurry according to claim 1, which further comprises a gelling agent, a filler selected from the group consisting of particulate and fibrous fillers, a labelling agent, and a dissolved electrolyte extender.

13. A slurry according to claim 12, wherein said gelling agent is selected from the group consisting of polyacrylic acid, carboxymethylcellulose and partially hydrolyzed polyacrylonitrile.

14. A slurry according to claim 12, wherein said filler is selected from the group consisting of powdered graphite, carbon fibers, cellulose fibers, calcium hydroxide, silicon dioxide, titanium dioxide, titanium suboxide, polymeric microspheres, glass microspheres, and any of said microspheres coated with a metal selected from the group consisting of Cu, Ni, Cd, Sn, Ag and Pb.

15. A slurry according to claim 12, wherein said labelling agent is selected from the group consisting of colored dyes, fluorescent dyes and encapsulated magnetic particles.

16. A slurry according to claim 15, wherein said labelling agent is selected from the group consisting of Cresol Red, sodium fluorescein and nylon-, polypropylene-, polyvinyl chloride- and polytetrafluoroethylene-encapsulated $Fe_3O_4$.

17. A slurry according to claim 12, wherein said dissolved electrolyte extender is selected from the group consisting of potassium silicate, sodium silicate, sorbitol, potassium borate and potassium phosphates and mixtures thereof.

18. A slurry according to claim 1, which further comprises a gelling agent, a filler selected from the group consisting of particulate and fibrous fillers and a labelling agent.

19. A slurry according to claim 12, wherein 0.03—3% by weight of said gelling agent, 1.0-10.0% by weight of said filler, 0.001-1.0% by weight of said labelling agent and 0.1-10% by weight of said dissolved electrolyte extender, in respect to the total weight of the slurry are present in said slurry.

20. A slurry for use in rechargeable metal-air batteries, comprising particulate porous zinc containing material selected from the group consisting of porous zinc and a particulate inert substrate coated with porous zinc and having a particle size within the range of 100-500 microns, a density within the range of 0.3-1.4g./cc and a surface area within the range of 0.5-6.0m$^2$/g, an 4-12 moles/liter aqueous solution of potassium hydroxide, an inorganic inhibitor ingredient effective to inhibit interaction of said particulate porous zinc containing material and said aqueous solution to prevent evolution of hydrogen gas, a gelling agent, a filler selected from the group consisting of particulate and fibrous fillers, a labelling agent and a dissolved electrolyte extender, wherein the weight ratio between said porous zinc containing material, said aqueous solution and said inorganic inhibitor is 1:0.5-2.0:0.0005-0.04 and the slurry contains 0.3-3.0% by weight of said gelling agent, 1.0-10.0% by weight of said filler, 0.001-10% by weight of said labelling agent and 0.1-10.0% of said electrolyte extender, and the amount of zinc in the slurry is within the range of 33.3-67% by weight.

21. A slurry according to claim 20, wherein said porous zinc containing material is a particulate inert substrate coated with zinc and said substrate has a particle size falling within the range of 10-250 microns.

22. A slurry according to claim 21, wherein said particulate inert substrate is made of a material selected from the group consisting of polypropylene, polyethylene, nylon, glass and polyvinyl chloride.

23. A slurry according to claim 21, wherein said particulate inert substrate is made of a material selected from the group consisting of polypropylene, polyethylene, nylon, glass and polyvinyl chloride microspheres.

24. A slurry according to claim 20, wherein said inorganic inhibitor ingredient is selected from the group consisting of one of oxides of bismuth, cadmium, gallium, indium, lead, mercury, thallium and tin and one of sulfides of cadmium, iron, lead and mercury and mixtures thereof.

25. A slurry according to claim 20, which comprises additionally an organic inhibitor selected from the group consisting of phosphate esters, surfactants and quaternary ammonium compounds.

26. A slurry according to claim 20, wherein said gelling agent is selected from the group consisting of polyacrylic acid, carboxymethylcellulose and partially hydrolyzed polyacrylonitrile.

27. A slurry according to claim 26, wherein said filler is selected from the group consisting of powdered graphite, carbon fibers, cellulose fibers, calcium hydroxide, silicon dioxide, titanium dioxide, titanium suboxide, polymeric microspheres, glass microspheres, and any of said microspheres coated with a metal selected from the group consisting of CU, Ni, Cd, Sn, Ag and Pb.

28. A slurry according to claim 20, wherein said labelling agent is selected from the group consisting of colored dyes, fluorescent dyes and encapsulated magnetic particles.

29. A slurry according to claim 48, wherein said labelling agent is selected from the group consisting of Cresol Red, sodium fluorescein and nylon-, polypropylene-, polyvinyl chloride- and polytertrafluoroethylene-encapsulated $Fe_3O_4$.

30. A slurry according to claim 20, wherein said electrolyte extender is selected from the group consisting of potassium silicate, sodium silicate, sorbitol, potassium borate and potassium phosphates and mixtures thereof.

31. A slurry for use in rechargeable metal-air batteries, comprising particulate porous zinc containing material selected from the group consisting of porous zinc and a particulate inert substrate coated with porous zinc, and being of a particle size within the range of 100-500 microns and having a surface area within the range of $0.5-6.0 m^2/g$, said porous zinc having a density which is 5-20% of the density of non-porous zinc and said particulate inert substrate having a particle size falling within the range of 10-250 microns, an 4-12 moles/liter aqueous solution of potassium hydroxide, and an inorganic inhibitor ingredient effective to inhibit an interaction between said particulate porous zinc containing material and said aqueous solution to prevent an evolution of hydrogen gas, wherein the slurry contains 33.3 to 67.0 percent by weight of zinc and the weight ratio between said porous zinc containing material, said aqueous solution and said inorganic inhibitor is 1:0.5-2.0: 0.0005-0.04.

32. A slurry according to claim 31, wherein said particulate inert substrate is made of a material selected from the group consisting of polypropylene, polyethylene, nylon, glass and polyvinyl chloride.

33. A slurry according to claim 31, wherein said particulate inert substrate is made of a material selected from the group consisting of polypropylene, polyethylene, nylon, glass and polyvinyl chloride microspheres.

34. A slurry according to claim 31, wherein said inorganic inhibitor ingredient is selected from the group consisting of one of oxides of antimony, bismuth, cadmium, gallium, indium, lead, mercury, thallium and tin and one of sulfides of cadmium, iron, lead and mercury and mixtures thereof.

35. A slurry according to claim 31, which comprises additionally an organic inhibitor selected from the group consisting of phosphate esters, surfactants and quaternary ammonium compounds.

36. A slurry according to claim 31, which further comprises a gelling agent, a filler selected from the group consisting of particulate and fibrous fillers, a labelling agent, and a dissolved electrolyte extender.

37. A slurry according to claim 36, wherein said gelling agent is selected from the group consisting of polyacrylic acid, carboxymethylcellulose and partially hydrolyzed polyacrylonitrile.

38. A slurry according to claim 36, wherein said filler is selected from the group consisting of powdered graphite, carbon fibers, cellulose fibers, calcium hydroxide, silicon dioxide, titanium dioxide, titanium suboxide, polymeric microspheres, glass microspheres, and any of said microspheres coated with a metal selected from the group consisting of Cu, Ni, Cd, Sn, Ag and Pb.

39. A slurry according to claim 36, wherein said labelling agent is selected from the group consisting of colored dyes, fluorescent dyes and encapsulated magnetic particles.

40. A slurry according to claim 36, wherein said labelling agent is selected from the group consisting of Cresol Red, sodium fluorescein and nylon-, poly-propylene-, polyvinyl chloride- and polytetrafluoroethylene-encapsulated $Fe_3O_4$.

41. A slurry according to claim 36, wherein said electrolyte extender is selected from the group consisting of potassium silicate, sodium silicate, sorbitol, potassium borate and potassium phosphates and mixtures thereof.

42. A slurry according to claim 31, which further comprises a gelling agent, a filler selected from the group consisting of particulate and fibrous fillers, and a labelling agent.

43. A slurry according to claim 36, wherein 0.03-3% by weight of said gelling agent, 1.0-10.0% by weight of said filler, 0.001-1.0% by weight of said labelling agent and 0.1-10% by weight of said dissolved electrolyte extender, in respect to the total weight of the slurry are present in the slurry.

* * * * *